United States Patent [19]

Pilgrim et al.

[11] E Re. 30,789

[45] Reissued Nov. 3, 1981

[54] PROCESS FOR COATING SHEET SUBSTRATES WITH THERMOPLASTIC POLYMER

[75] Inventors: James F. Pilgrim, Glenburnie; Ronald A. Hunter, Amherstview, both of Canada

[73] Assignee: E. I. Du Pont de Nemours and Company, Wilmington, Del.

[21] Appl. No.: 97,234

[22] Filed: Nov. 26, 1979

Related U.S. Patent Documents

Reissue of:

[64] Patent No.: 4,143,187
Issued: Mar. 6, 1979
Appl. No.: 856,506
Filed: Dec. 1, 1977

[51] Int. Cl.[3] ..... B05D 3/12

[52] U.S. Cl. ..... 427/358; 118/119; 118/410; 118/411; 118/412; 118/413; 118/414; 118/415; 264/174; 427/393

[58] Field of Search ..... 118/410, 411, 412, 413, 118/414, 415, 119; 264/174; 427/358, 393

[56] References Cited

U.S. PATENT DOCUMENTS 3,544,669 12/1970 Schock ..... 428/215 X
4,004,774 1/1977 Houston ..... 427/291 X

FOREIGN PATENT DOCUMENTS 1054883 1/1967 United Kingdom .

*Primary Examiner*—Michael R. Lusignan

[57] ABSTRACT

An improved process for coating sheet substrates with thermoplastic polymer is disclosed. In the process the sheet substrate forms one die lip of the extrusion coating die. The sheet substrate is passed from face-to-face contact with the metal block of the extrusion coating die into a spaced apart relationship with one die lip of the extrusion coating die, the sheet substrate forming the second die lip. Molten thermoplastic polymer is extruded into the space between the one die lip and the sheet substrate, thereby coating the sheet substrate with polymer. The preferred polymer is a poly-α-olefin, especially polyethylene or a copolymer of ethylene and butene-1. The preferred sheet substrate has orifices in the surfaces thereof. The process may be used to coat sheet substrates with a thermoplastic polymer, e.g. in the manufacture of form boards for the construction industry.

7 Claims, 2 Drawing Figures

PROCESS FOR COATING SHEET SUBSTRATES WITH THERMOPLASTIC POLYMER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a process for coating sheet substrates with thermoplastic polymer and in particular to an improved process for coating sheet substrates with a relatively thick coating of thermoplastic polymer in which the sheet substrate forms one die lip of the extrusion coating die employed in the coating process.

2. DESCRIPTION OF THE PRIOR ART

Techniques for the coating or lamination of a sheet substrate with thermoplastic polymer to form coated panels are known. For example the substrate and the thermoplastic polymer in the form of film or sheet may be brought into contact and laminated by the application of heat and pressure. Alternatively, the sheet substrate may be coated with thermoplastic polymer in a heated, and especially in a molten form. Adhesion of the thermoplastic polymer to the substrate is usually enhanced by applying pressure to the coated substrate before the thermoplastic polymer cools. Adhesives may be applied to the substrate before the substrate is coated with the thermoplastic polymer. Alternatively, adhesion-promoting compounds may be applied to the substrate or incorporated into the thermoplastic polymer.

Thermoplastic polymer-coated sheet substrate in the form of coated panels may be used in a variety of end uses. For example, polyolefin-coated wooden panels may be used as concrete form boards, as is disclosed by D. H. Dawes and J. P. van den Steen in Canadian Pat. No. 931,486 which issued Aug. 7, 1973. Coated panels may also be used in the conconstruction industry in interior and exterior applications. Techniques for coating wooden structures so as to obtain products of improved properties are disclosed in U.S. Pat. No. 3,544,669 of F. Schock which issued Dec. 1, 1970.

Coated panels having a coating of thermoplastic material of a thickness of at least 0.25 mm on a substantially inflexible substrate are disclosed in U.S. Pat. No. 4,004,774 of A. J. Houston which issued Jan. 25, 1977. In the coated panels disclosed by A. J. Houston, the coating of thermoplastic material is mechanically attached to the substrate. The substrate has a plurality of orifices in the surface thereof that is to be coated, the orifices being of a shape such that at least in part, the cross-sectional area of the orifice increases as the distance from the surface of the substrate increases. The coating of thermoplastic material is applied so that the thermoplastic material extends into the orifices at least as far as the portion of the orifices of increasing cross-sectional area.

An improved process for the coating of sheet substrates with thermoplastic polymer so as to form coated panels, especially the coated panels disclosed by A. J. Houston, has now been found.

SUMMARY OF THE INVENTION

Accordingly the present invention provides in a process for coating a substantially inflexible sheet substrate with a coating of thermoplastic polymer in which molten thermoplastic polymer is extruded between first and second die lips of an extrusion coating die and onto a face of said sheet substrate, said extrusion die being formed, in part of a metal block having means to feed molten polymer therethrough to said die lips, the improvement comprising feeding the sheet substrate in face-to-face contact with said metal block over substantially the entire width of said sheet substrate, passing said sheet substrate from contact with the metal block into spaced apart relationship with the first die lip, said sheet substrate thereby forming the second die lip of the extrusion coating die, extruding molten thermoplastic polymer into the space between the first die lip and the sheet substrate and thereby coating the sheet substrate with thermoplastic polymer.

In a preferred embodiment of the process of the present invention, the sheet substrate has a plurality of orifices in the surface thereof that is to be coated, the orifices being of a shape such that, at least in part, the cross-sectional area of the orifices increases by at least ten percent as the distance from the surface of the substrate increases.

In a further embodiment the thermoplastic polymer is a polyolefin especially a homopolymer of ethylene or a copolymer of ethylene and butene-1.

In another embodiment the coating on the substrate is, prior to solidification of the molten thermoplastic polymer, contacted with at least one roll, the roll preferably having a smooth surface.

DETAILED DESCRIPTION OF THE INVENTION

As stated above the present invention relates to the coating of sheet with a thermoplastic polymer. The invention will be described hereinafter with particular reference to FIGS. 1 and 2.

Figure 1:
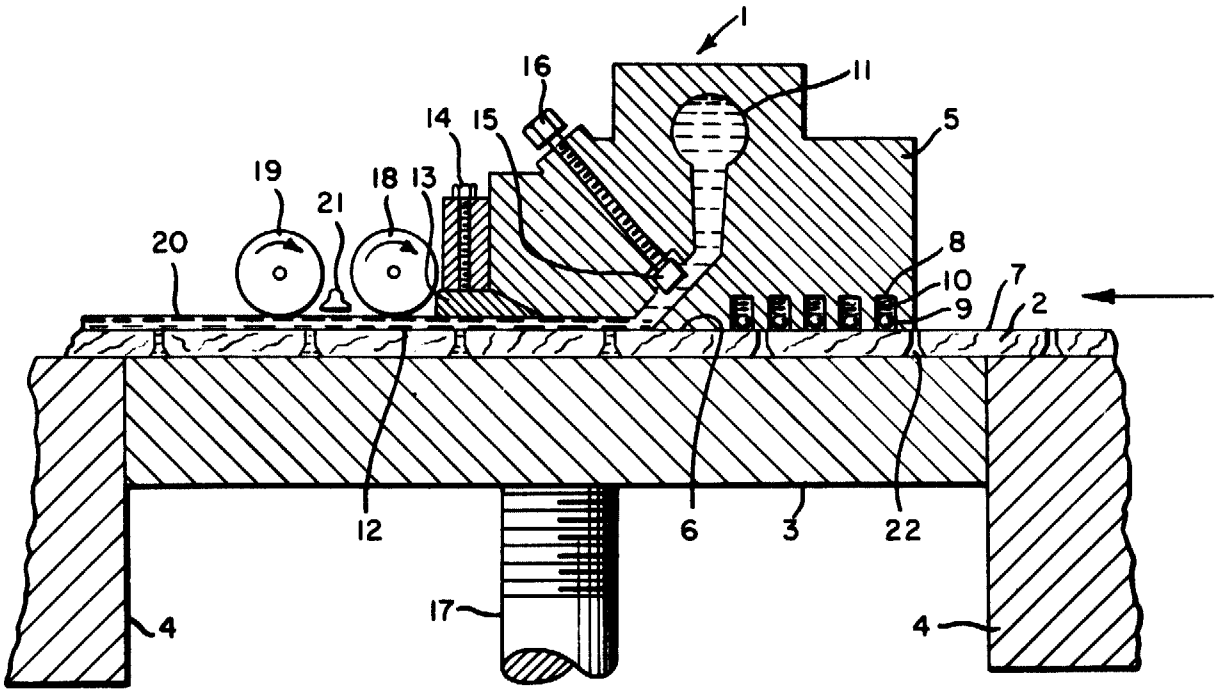
FIG. 1 is a schematic representation of the cross-section of one embodiment of the present invention.

With reference to the embodiment shown in FIG. 1 the apparatus used in the embodiment comprises an extrusion coating die, indicated generally by 1, a sheet substrate 2, and adjustable platform 3 and supports 4. The extrusion coating die 1 has a metal block 5 with a planar bottom surface 6 in face-to-face contact with the upper surface 7, i.e. the surface that is to be coated with thermoplastic polymer, of sheet substrate 2. Planar bottom surface 6 of metal block 5 has a number of recesses 8 therein. In recesses 8 are located rotatable ball 9 and spring 10. Rotatable ball 9 is held in contact with surface 7 of sheet substrate 2 by spring 10 and facilitates the movement of sheet substrate 2 with respect to planar bottom surface 6 of metal block 5.

Metal block 5 has a channel 11 in fluid communication with a source (not shown) of molten thermoplastic polymer. Channel 11 is, in turn, in fluid flow communication with die gap 12, die gap 12 being the space formed between the surface 7 of sheet substrate 2 and upper die lip 13. Upper die lip 13 is attached to metal block 5 and is located in the side of metal block 5 that is away from that adjacent to recesses 8 in the planar bottom surface 6 of metal block 5. Die gap 12 is adjustable by, for example, adjustment of the upper die lip 13, such adjustment being accomplished by die lip adjustment means 14.

Choker bar 15 extends through metal block 5 and partially into channel 11. The extent to which choker bar 15 extends into channel 11 is adjustable using choker bar adjustment 16. Sheet substrate 2 is supported by adjustable platform 3 and supports 4. The position of adjustable platform 3 with respect to extrusion coating die 1 may be adjusted using worm screw 17.

In the embodiment shown two rolls 18 and 19 are shown to be located adjacent to upper die lip 13. The surfaces of rolls 18 and 19 are in contact with coating 20 on sheet substrate 2. Air cooling means 21 is located between roll 18 and roll 19 and spaced apart from coating 20. The air cooling means may also be located before roll 18 or after roll 19, or any combination thereof.

In the embodiment shown the sheet substrate 2 has a plurality of orifices 22 located therein. Orifices 22 are of smaller cross-sectional area near the surface 7 of sheet substrate 2 than at a position away from the surface.

Figure 2:
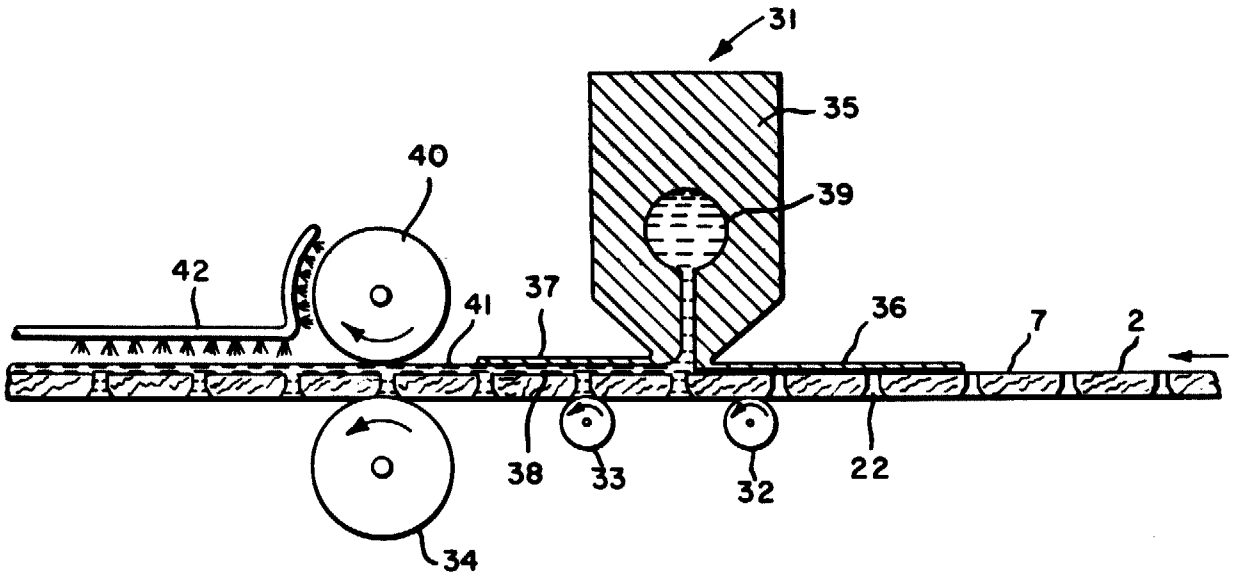
FIG. 2 is a schematic representation of the cross-section of another embodiment of the present invention.

In the embodiment shown in FIG. 2 the apparatus comprises an extrusion coating die, indicated generally by 31, a sheet substrate 2, support rolls 32 and 33 and drive roll 34. The extrusion coating die 31 has a metal block 35 with a planar bottom surface that consists of two sections viz. rear extended die lip 36 and front extended die lip 37. Rear extended die lip 36 is in face-to-face contact with upper surface 7, i.e. the surface that is to be coated with thermoplastic polymer, of sheet substrate 2. Front extended die lip 37 is in spaced apart relationship, but essentially parallel to, upper surface 7 of sheet substrate 2. The space between front extended die lip 37 and sheet substrate 2 forms die gap 38.

Metal block 35 has a channel 39 in fluid flow communication with die gap 38, channel 39 being connected to a source (not shown) of molten polymer.

Support rolls 32 and 33 are located under sheet substrate 2 opposite extrusion coating die 31. Drive roll 34 is located beyond the end of front extended die lip 37 and on the opposite side of sheet substrate 2 thereto. Surface roll 40 is located opposite drive roll 34 i.e. on the same side of sheet substrate 2 as front extended die lip 37. Surface roll 40 is in contact with coating 41.

Air ring 42 is located above coating 41 and adjacent to surface roll 40. Air ring 42 is on the opposite side of surface roll 40 to front extended die lip 37.

In operation of the apparatus of FIG. 1, the position of adjustable platform 3 is adjusted so that sheet substrate 2 will be in sliding engagement with both planar bottom surface 6 of metal block 5 and adjustable platform 3. Sheet substrate 2 is passed, using driving means not shown, in sliding engagement with planar bottom surface 6 and adjustable platform 3, such passage being facilitated by rotatable balls 9. Sheet substrate 2 then passes into spaced apart relationship with upper die lip 13, thereby forming die gap 12. Molten thermoplastic polymer is extruded through channel 11 into die gap 12. The rate of flow of thermoplastic polymer may be adjusted in part using choker bar 15. If the sheet substrate 2 has orifices 22, as is shown in the embodiment illustrated in FIG. 1, the pressure of the thermoplastic polymer as the result of extrusion of the polymer through channel 11 forces polymer into orifices 22. The thickness of the coating may be adjusted by in particular adjusting the position of upper die lip 13. The coating 20 of molten thermoplastic polymer thus formed on sheet substrate 2 then cools, or is cooled by external means, thereby forming a solidified coating of thermoplastic polymer on the sheet substrate.

The sheet substrate 2 may be used in relatively long lengths with the coated substrate being cut into desired length or the sheet substrate 2 may be pre-cut into the desired lengths and fed to the extrusion coating die in an essentially abutting series of sheet substrate sections.

In a preferred embodiment the coating 20 is contacted with at least one driven roll, rolls 18 and 19 of FIG. 1, after coating 20 becomes out of contact with upper die lip 13. The rolls preferably have smooth surfaces and are adapted to provide a smooth surface on coating 20. Coating 20 may also be cooled using air cooling means 21. In a particularly preferred embodiment as the coated substrate passes from the extrusion coating die, the still molten coating is contacted with, in series, roll 18, cooling air from air cooling means 21 and roll 19.

In another embodiment an auxiliary heater is located in upper die lip 13. The auxiliary heater may be used to reduce or eliminate "cold spots" in the extruded coating and to reduce or prevent sticking of the coating 20 to upper die lip 13.

The apparatus of FIG. 2 is operated in a manner similar to that of FIG. 1. Sheet substrate 2 is passed, using drive means not shown and/or drive roll 34, in sliding engagement with rear extended lip 36 and supported by rolls 32 and 33. Sheet substrate 2 is in spaced apart relationship with front extended lip 37, thereby forming die gap 38. Molten thermoplastic polymer is extruded through channel 39 into die gap 38. The rate of flow of thermoplastic polymer may be controlled within channel 39 by means not shown. If sheet substrate 2 has orifices 22, as is shown in FIG. 2, the pressure of the thermoplastic polymer as the result of extrusion of the polymer through channel 39 forces polymer into orifices 22. The thickness of coating 41 may be adjusted by in particular adjusting the position of front extended lip 37.

Roll 40 is preferably a smooth roll so as to aid in smoothing the surface of coating 41 although roll 40 may be adapted to emboss the surface of coating 41. In the embodiment shown in FIG. 2 air ring 42 is adapted to cool both coating 41 and roll 40.

The sheet substrate 2 may be any substantially inflexible sheet substrate that will not melt or be significantly degraded at the temperatures used in the extrusion of the thermoplastic polymer. The substrate preferably has a plurality of orifices in the surface thereof that is to be coated. The orifices preferably are of a shape such that, at least in part, the cross-sectional area of the orifices increases by at least ten percent as the distance from the surface of the substrate increases. The orifices are preferably of a cross-sectional area of greater than 0.035 sq. cms. The depth of the orifices may be equal to or less than the thickness of the sheet substrate. The preferred substrate is wood but substrates of metal or of a polymer, especially thermoplastic polymer, that does not melt or significantly degrade at the temperatures used in the process may be used.

The coating applied to the substrate is preferably of a thickness of at least 0.25 mm and especially 0.5–3.0 mm.

The thermoplastic polymer used for coating 20 must be capable of being extruded and must be solid under the conditions of the proposed end use of the coated substrate. Preferred thermoplastic polymers are polyamides, for example polyhexamethylene adipamide, polystyrene, polyvinyl chloride and poly-α-olefins, for example polypropylene and especially homopolymers of ethylene and copolymers of ethylene and α-olefins, for example, butene-1 or vinyl acetate.

The thermoplastic polymer may contain fillers, pigments, stabilizers, foaming agents and/or reinforcing agents. For homopolymers of ethylene and copolymers of ethylene and butene-1 the melt index is preferably in the range 0.2–30.0 and especially in the range 0.3–7.5, melt index being measured by the method of ASTM D-1238 (Condition E). Preferred homopolymers of ethylene and copolymers of ethylene and butene-1 are those of densities of at least 0.935 g/cm$^3$ and especially at least 0.945 g/cm$^3$ and in particular such polymers having a broad molecular weight distribution.

Suitable polyethylenes may be obtained by any of the well known polymerization processes; using a coordination catalyst is a particularly useful route which may be readily adapted to provide homopolymers of ethylene as well as copolymers of ethylene and other α-olefins, for example butene-1.

Processes for the extrusion coating of substrates, especially wooden substrates having orifices, are susceptible to a number of potential process problems. The potential problems include tendencies for "sink marks" or dimples to appear in the surface of the coating at the location of the orifices in the substrate, for incomplete filling of the orifices and for the wooden substrate to warp and thus become nonplanar. As is illustrated hereinafter the present invention is capable of producing coated substrates of higher quality than those from a so-called "conventional" coating process in which the die is positioned above the substrate and the polymer is extruded down and onto the substrate. Conventional processes often include a smoothing roll similar to roll 40 described hereinabove, excess polymer being allowed to accumulate adjacent to the smoothing roll to aid in the attaining of a uniform coating.

In the process of the present invention the orifices may readily be filled with the thermoplastic polymer. Moreover the front extended die lip of the die significantly reduces any tendencies for the substrate to warp and for sink marks to form if the substrate has orifices.

The length of the extension of the die lips is a factor in the operation of processes of the present invention. Preferably the length of the front extended die lip is at least 10 cm and in particular at least 15 cm.

In addition to the use of the extended die lips, the use of air rings and especially the rate of cooling of the coating achieved thereby may be a factor in the formation of sink marks in the coating.

If the sheet substrate is wood, it is preferable to dry the surface thereof before coating the substrate according to the process of the present invention.

While the process of the present invention has been described hereinabove with particular reference to the coating of substrates having orifices, the process may be used with substrates having no orifices or with substrates having slits in the surface thereof, especially alternating elongated slits at angles of about 45° and about 135° to the surface.

The process of the present invention is particularly useful for the manufacture of the coated panels described in the aforementioned U.S. Pat. No. 4,004,774 of A. J. Houston. In particular the process of the present invention may be used in the manufacture of polyethylene-coated wooden form boards for use in the construction industry.

The present invention is illustrated by the following examples:

EXAMPLE I

Plywood sheets having a width of 15 cm and a thickness of 1.25 cm and having orifices spaced apart at approximately 2.5 cm centres, the orifices being of a diameter of 0.62 cm extending therethrough and reamed to a diameter of 1.2 cm on the side of the plywood that was not to be coated, were dried in an oven at 121° C. for 30 minutes. The dried plywood sheets were then coated using the apparatus illustrated in FIG. 2 and described hereinabove.

The thickness of the coating was approximately 1.8 mm. The coating could be removed from the coated plywood sheets only if the polymer was sheared at the orifices.

In order to test the coated plywood, samples of the coated plywood were immersed in water for a period of time. The panels were then examined for cracks extending from an orifice to an adjacent orifice.

Further details and the results obtained are given in Table I.

TABLE I

| Run | 1 | 2 | 3 | 4 | 5 | 6 |
|---|---|---|---|---|---|---|
| Polymer* | A | B | C | D | E | F |
| Polymer Temperature (°C.) | 287 | 271 | 237 | 237 | 237 | 237 |
| Melt Pressure (Kg/cm$^2$) in die | 4390 | 4390 | 4460 | 4480 | 3950 | 3950 |
| Speed of Plywood (m/min) | 1.5 | 1.5 | 1.2 | 1.2 | 1.8 | 1.8 |
| Orifices Filled With Polymer (%) | 100 | 100 | 100 | 100 | 100 | 100 |
| Warpage of Coated Plywood | none | none | none | none | none | none |
| Sink Marks in Coating | none | none | none | none | none | none |
| Testing of Samples | | | | | | |
| (a) Temperature of Water (°C.) | 80 | 80 | 80 | 80 | 80 | 80 |
| Test Time (hours) | 24 | 24 | 24 | 24 | 24 | 24 |
| Appearance of Cracks | yes | yes | no | no | yes | yes |
| (b) Temperature of Water (°C.) | 20 | 20 | 20 | 20 | 20 | 20 |
| Test Time (hours) | 624 | 624 | 624 | 624 | 624 | 624 |
| Appearance of Cracks | no | no | no | no | no | no |

*Polymer A - ethylene homopolymer having a density of 0.960, a melt index of 0.75 and a broad molecular weight distribution
Polymer B - ethylene homopolymer having a density of 0.950, a melt index of 4.0 and a medium molecular weight distribution
Polymer C - ethylene/butene-1 copolymer having a density of 0.943, a melt index of 1.25 and a broad molecular weight distribution
Polymer D - ethylene/butene-1 copolymer having a density of 0.946, a melt index of 0.35 and a broad molecular weight distribution
Polymer E - ethylene homopolymer having a density of 0.956, a melt index of 1.0 and narrow molecular weight distribution
Polymer F - ethylene/butene-1 copolymer having a density of 0.947, a melt index of 2.49 and a medium molecular weight distribution.

EXAMPLE II

As a comparison the plywood of Example I was coated using a conventional process. A flat film die was located above the plywood at a height of 0.6 cm. Molten polymer was extruded onto the plywood and was allowed to accumulate adjacent to a smoothing roll located approximately 5 cm from the die.

Further details and the results obtained were as follows:

| Run<br>Polymer** | 7<br>G | 8<br>H | 9<br>I | 10<br>J |
|---|---|---|---|---|
| Polymer Temperature (°C.) | 240 | 240 | 225 | 240 |
| Speed of Plywood (m/min) | 1.5 | 1.5 | 1.5 | 1.5 |
| Coating Thickness (mm) | 1.2 | 1.8 | 1.8 | 2.1 |
| Orifices filled with Polymer (%) | 50 | NM | 30 | 0 |
| Warpage of Coated Plywood | yes | yes | yes | yes |
| Sink Marks in Coating | yes | yes | yes | yes |

**Polymer G - ethylene/butene-1 copolymer having a density of 0.946, a melt index of 5 and a narrow molecular weight distribution Polymer H - ethylene homopolymerr having a density of 0.960, a melt index of 0.4 and a broad molecular weight distribution

**Polymer I - ethylene homopolymer having a density of 0.960, a melt index of 5 and a narrow molecular weight distribution Polymer J - ethylene homopolymer having a density of 0.955, a melt index of 2.5 and a medium molecular weight distribution NM - not measured but less than 50%.

EXAMPLE III

Plywood sheets of the type described in Example I were coated with extrusion grade polyvinyl chloride having a specific gravity of 1.37 and a Shore A hardness of 85 and which had been obtained from Carlew Chemicals Limited of Montreal, Que., under the trade designation Y. 371. Nat. The sheets were coated at a speed of 0.5 m/min using the procedure described in Example I. The melt temperature of the polyvinyl chloride on extrusion was 216° C.

The polyvinyl chloride coating extended through the orifices in the sheet to the part thereof that had been reamed. The coating, which had a thickness of approximately 0.8 cm, could only be removed from the coated plywood sheets if the polymer was sheared at the orifices.

We claim:

[1. In a process for coating a substantially inflexible sheet substrate with a coating of thermoplastic polymer in which molten thermoplastic polymer is extruded between first and second die lips of an extrusion coating die and onto a face of said sheet substrate, said extrusion die being formed, in part, of a metal block having means to feed molten polymer therethrough to said die lips, the improvement comprising feeding the sheet substrate in face-to-face contact with said metal block over substantially the entire width of said sheet substrate, passing said sheet substrate from contact with the metal block into spaced apart relationship with the first die lip, said sheet substrate thereby forming the second die lip of the extrusion coating die, the first die lip extending substantially parallel to and in spaced apart relationship from the sheet substrate for a distance of at least 10 cm, said sheet substrate having a plurality of openings selected from the group consisting of orifices and slits in the surface thereof, extruding molten thermoplastic polymer into the space between the first die lip and the sheet substrate and thereby coating the sheet substrate with thermoplastic polymer.]

[2. The process of claim 1 in which the thermoplastic polymer is selected from the group consisting of polyamides, polystyrene, polyvinyl chloride and poly-α-olefins.]

[3. The process of claim 2 in which the thermoplastic polymer is polyvinyl chloride.]

[4. The process of claim 2 in which the thermoplastic polymer is a poly-α-olefin.]

[5. The process of claim 4 in which the poly-α-olefin is selected from the group consisting of homopolymers of ethylene and copolymers of ethylene and butene-1.]

[6. The process of claim 5 in which the sheet substrate is wood.]

[7. The process of claim 5 in which that part of the metal block which contacts the sheet substrate in face-to-face contact is a rear extended die lip.]

8. The process of claim [5] *15* in which the openings are orifices, said orifices being of a shape such that, at least in part, the cross-sectional area of the orifices increases as the distance from the surface of the substrate increases.

[9. The process of claim 8 in which the substrate is wood.]

10. The process of claim [9] *15* in which the first die lip extends substantially parallel to and in spaced apart relationship to the sheet substrate for a distance of at least 15 cm.

11. The process of claim [9] *15* in which an air ring is used to cool the polymer after extrusion thereof.

12. The process of claim [9] *15* in which a smoothing roll is used to apply a smooth surface to the coating.

13. The process of claim [9] *15* in which the polymer has a density of at least 0.935 gm/cm$^3$ and a melt index in the range 0.2–30.

14. The process of claim [9] *15* in which the polymer has a density of at least 0.945 gm/cm$^3$ and a melt index in the range 1–7.5 and that part of the metal block which contacts the sheet substrate in face-to-face contact is a rear extended die lip.

*15. In a process for coating a substantially inflexible sheet substrate with a coating of thermoplastic polymer having a thickness of at least 0.25 mm in which molten thermoplastic polymer is extruded between first and second die lips of an extrusion coating die and onto the face of said sheet substrate, said extrusion die being formed, in part, of a metal block having means to feed molten polymer therethrough to said die lips, the improvement comprising feeding a wood sheet substrate in face-to-face contact with said metal block over substantially the entire width of said sheet substrate, passing said sheet substrate from contact with the metal block into spaced apart relationship with the first die lip, said sheet substrate thereby forming the second die lip of the extrusion coating die, the first die lip extending substantially parallel to and in spaced apart relationship from the sheet substrate for a distance of at least 10 cm, said sheet substrate having a plurality of openings selected from the group consisting of orifices or slits in the surface thereof, extruding molten thermoplastic polymer into the space between the first die lip and the sheet substrate and thereby coating the sheet substrate with thermoplastic polymer.*

* * * * *

UNITED STATES PATENT AND TRADEMARK OFFICE

CERTIFICATE OF CORRECTION

PATENT NO. : Re. 30,789

DATED : November 3, 1981

INVENTOR(S) : JAMES F. PILGRIM and RONALD A. HUNTER

It is certified that error appears in the above—identified patent and that said Letters Patent is hereby corrected as shown below:

On the printed face sheet of the reissue patent, the Assignee reading "E. I. Du Pont de Nemours and Company, Wilmington, Del." should read --Du Pont Canada Limited, Montreal, Canada --.

Signed and Sealed this

*Twenty-sixth* Day of *October 1982*

[SEAL]

*Attest:*

GERALD J. MOSSINGHOFF

*Attesting Officer*

*Commissioner of Patents and Trademarks*